(12) United States Patent
Shi et al.

(10) Patent No.: US 10,021,544 B2
(45) Date of Patent: Jul. 10, 2018

(54) DUAL SIM DUAL STANDBY WITH CALLER ID ENHANCEMENT

(71) Applicant: Apple Inc., Cupertino, CA (US)

(72) Inventors: Jianxiong Shi, Dublin, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 15/004,673

(22) Filed: Jan. 22, 2016

(65) Prior Publication Data

US 2016/0219421 A1 Jul. 28, 2016

Related U.S. Application Data

(60) Provisional application No. 62/108,025, filed on Jan. 26, 2015, provisional application No. 62/112,392, filed on Feb. 5, 2015.

(51) Int. Cl.
| | |
|---|---|
| *H04W 4/00* | (2018.01) |
| *H04W 4/16* | (2009.01) |
| *H04M 3/42* | (2006.01) |
| *H04W 76/15* | (2018.01) |
| *H04W 88/06* | (2009.01) |

(52) U.S. Cl.
CPC ......... *H04W 4/16* (2013.01); *H04M 3/42042* (2013.01); *H04W 76/15* (2018.02); *H04W 88/06* (2013.01)

(58) Field of Classification Search
CPC ..... H04W 4/16; H04W 76/025; H04W 88/06; H04M 3/42042
USPC .......................................... 455/434; 370/338
See application file for complete search history.

(56) References Cited

U.S. PATENT DOCUMENTS

| | | | | |
|---|---|---|---|---|
| 8,428,568 | B1* | 4/2013 | Kim | H04M 3/02 455/415 |
| 8,874,077 | B2† | 10/2014 | Bergenwall | |
| 8,934,460 | B1† | 1/2015 | Hu | |
| 2011/0217969 | A1 | 9/2011 | Spartz et al. | |
| 2012/0289193 | A1* | 11/2012 | Bergenwall | H04W 12/12 455/410 |
| 2013/0303203 | A1* | 11/2013 | Wang | H04W 68/00 455/458 |
| 2014/0016614 | A1† | 1/2014 | Velev | |
| 2015/0094071 | A1 | 4/2015 | Hang et al. | |
| 2015/0223248 | A1 | 8/2015 | Silver et al. | |

(Continued)

OTHER PUBLICATIONS

"3GPP TS 34. 108 V 11.11.0 Standard, Section 7"; p. 10-11; Sep. 2014; © 2014, 3GPP Organizational Partners (ARIB, ATIS, CCSA, ETSI, TTA, TTC).†

*Primary Examiner* — Marcos Batista
(74) *Attorney, Agent, or Firm* — Meyertons Hood Kivlin Kowert & Goetzel, P.C.; Jeffrey C. Hood

(57) ABSTRACT

A Dual SIM Dual Standby (DSDS) user equipment (UE) which provides enhanced caller ID capabilities. In particular, the UE may be a Dual SIM Dual Active (DSDA) UE capable of using two SIMs and two radios so as to maintain two active voice calls simultaneously. The UE may include a single transmitter and one or more receivers. Mechanisms are described such that, when a first voice call is active, desirable services such as receiving and presenting caller ID information associated with this second call are provided to the user of the UE.

20 Claims, 9 Drawing Sheets

(56) References Cited

U.S. PATENT DOCUMENTS

| | | | | |
|---|---|---|---|---|
| 2015/0230070 A1* | 8/2015 | Kadiyala | ................ | H04W 4/16 455/417 |
| 2015/0289266 A1 | 10/2015 | Hsu et al. | | |
| 2016/0095087 A1* | 3/2016 | Mohseni | ............... | H04W 72/02 455/558 |
| 2016/0219648 A1* | 7/2016 | Awoniyi-Oteri | ...... | H04W 8/205 |

\* cited by examiner
† cited by third party

DUAL SIM DUAL STANDBY WITH CALLER ID ENHANCEMENT

PRIORITY CLAIM

The present application claims benefit of and priority to U.S. Provisional Application No. 62/108,025 titled "Dual SIM Dual Standby with Caller ID Enhancement," filed on Jan. 26, 2015, which is hereby incorporated by reference in its entirety as though fully and completely set forth herein, and also claims benefit of and priority to U.S. Provisional Application No. 62/112,392 titled "Dual SIM Dual Standby with Caller ID Enhancement," filed on Feb. 5, 2015, which is hereby incorporated by reference in its entirety as though fully and completely set forth herein.

TECHNICAL FIELD

The present application relates to wireless devices, and more particularly to an apparatus, system, and method for providing caller ID services in phones including a Dual SIM Dual Standby (DSDS) wireless phone.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

In particular, a user equipment (UE), e.g., a wireless device such as a cellular phone, may be capable of using multiple subscriber identity modules (SIMs). For example, a Dual SIM Dual Active (DSDA) UE is capable of using two SIMs and two radios, so as to maintain two active voice calls simultaneously. A DSDA UE is capable of receiving a second voice call while conducting a first, and switching between the two voice calls without dropping either.

A Dual SIM Dual Standby (DSDS) UE may comprise a single transmitter and one or more receivers. In DSDS, the UE, while conducting a first active voice call, may be able to receive a second voice call on the other receiver. If the user desired to accept the second voice call, the first call would have to be placed on hold (or standby), since the UE comprises only a single transmitter. When a first voice call is active, desirable services such as receiving and presenting caller ID information associated with this second call have not been available on a DSDS UE. Therefore, improvements in the field are desired. In addition, in a DSDS UE that implements multiple protocol stacks, it would be desirable to reduce the overhead associated with selection/reselection of PLMNs (Public Land Mobile Networks).

SUMMARY

Embodiments described herein relate to a user equipment (UE) and associated methods for enabling a Dual SIM Dual Active (DSDA) UE to support caller ID functions on a second received call while actively engaged on a first call. The UE may include at least two antennas, at least two Subscriber Identity Modules (SIMs), a single transmitter, and at least two receivers.

The UE may further comprise one or more processors coupled to the single transmitter, the at least two receivers, and the at least two SIMs, wherein the UE is configured to conduct a first voice call using the single transmitter and a first receiver and using a first protocol stack associated with a first SIM. The UE may be further configured to receive a second voice call on the second receiver, wherein the second voice call is received concurrently with the conducting the first voice call, wherein the second voice call utilizes a second protocol stack associated with a second SIM.

The UE may execute the first and second protocol stacks on the one or more processors to utilize the single transmitter in a time-sharing manner for a period of time to set up the incoming call. During this time period, caller ID information indicating a calling party of the second voice call may be received.

The UE may store the caller ID information of the second voice call for presentation to a user of the UE.

BRIEF DESCRIPTION OF THE DRAWINGS

A better understanding of the present disclosure can be obtained when the following detailed description of the embodiments is considered in conjunction with the following drawings.

Figure 1:
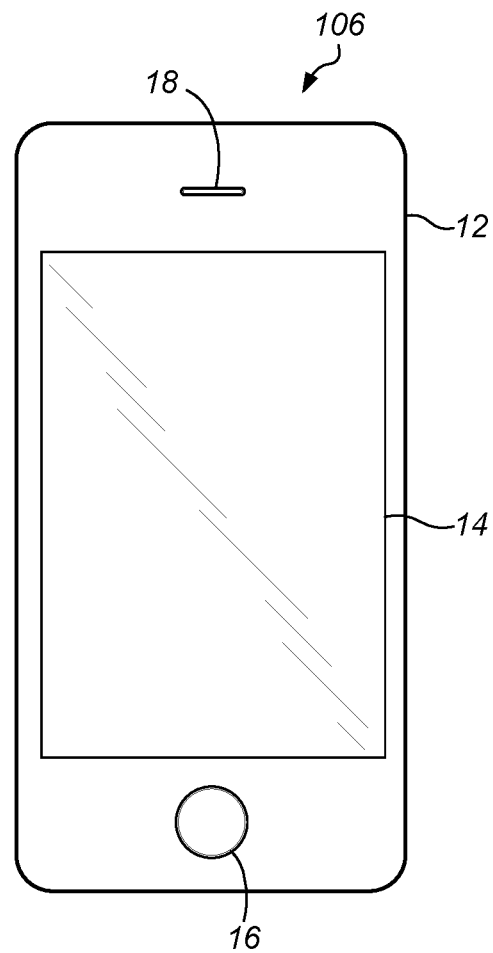
FIG. 1 illustrates an example user equipment (UE), according to some embodiments.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents, and alternatives falling within the spirit and scope of the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2

CDMA: Code Division Multiple Access
DSDA: Dual SIM Dual Active
DSDS: Dual SIM Dual Standby
GSM: Global System for Mobile Communications
LTE: Long Term Evolution
RAT: Radio Access Technology
RX: Receive
SIM: Subscriber Identity Module
TX: Transmit
UE: User Equipment
UMTS: Universal Mobile Telecommunications System Terms The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—the term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106, according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various cellular RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

The UE 106 may comprise at least two antennas. The UE 106 may also comprise any of various radio configurations, such as various combinations of one or more transmitter chains (TX chains) and two or more receiver chains (RX chains). For example, the UE 106 may comprise two radios that may each support one or more RATs. The two radios may each comprise a single TX (transmit) chain and a single RX (receive) chain. Alternatively, the two radios may each comprise an RX chain and may share a single TX chain.

In the embodiment described herein, the UE 106 comprises two antennas, which communicate using two or more RATs. For example, the UE 106 may have a pair of cellular telephone antennas, wherein each antenna is coupled to a respective single radio. Where two radios share a single TX chain, the antennas may be coupled to the shared portions of the radios (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The second antenna may also be coupled to the first TX chain. The first and second receiver chains may be independent in frequency to allow for simultaneous voice calls on each of the two radios. The first and second receiver chains may additionally share a common local oscillator, which means that both of the first and second receiver chains are capable of tuning to the same frequency.

In some embodiments, each radio may time multiplex among two or more RATs, such as LTE and one or more other RATs such as GSM or CDMA1x. In the primary embodiment described herein the UE 106 comprises one transmitter chain and two receiver chains.

Each antenna may receive a wide range of frequencies such as from 600 MHz up to 3 GHz. Thus, for example, the local oscillator of one receiver chain may tune to a specific frequency such as an LTE frequency band. The wireless circuitry in the UE 106 can be configured in real time depending on the desired mode of operation for the UE 106. In the example embodiment described herein, the UE 106 is configured to support LTE, W-CDMA (W), TDS-CDMA (T) and GSM (G) radio access technologies. In some embodiments, the UE 106 comprises two or more subscriber identity modules (SIMs), which each support one or more RATs.

Figure 2:
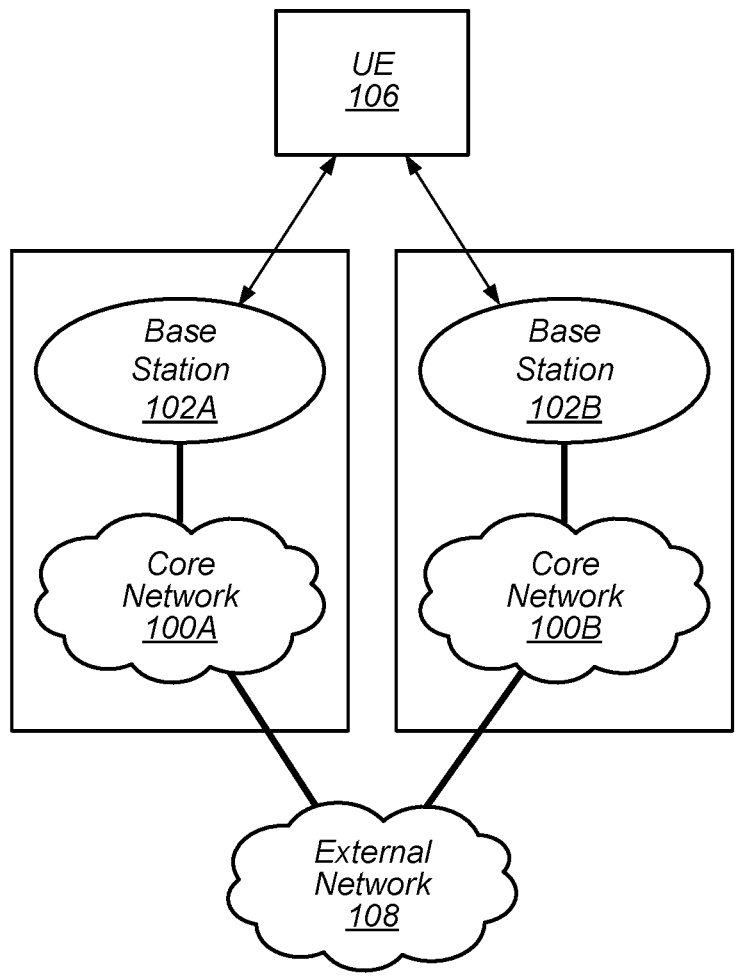
FIG. 2 illustrates an example wireless communication system in which a UE communicates with two base stations, according to some embodiments.

FIG. 2—Communication System

FIG. 2 illustrates an exemplary (and simplified) wireless communication system, according to some embodiments. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various RATs (also referred to as wireless communication technologies or telecommunication standards), such as LTE, W-CDMA, TDS-CDMA, and GSM, among possible others such as UMTS, LTE-A, CDMA2000 (e.g., 1×RTT, 1×EV-DO, HRPD, eHRPD), etc.

Base station 102A and core network 100A may operate according to a first RAT (e.g., LTE) while base station 102B and core network 100B may operate according to the same RAT or a second (e.g., different) RAT (e.g., GSM). The two core networks may be controlled by the same network operator (e.g., cellular service provider or "carrier"), or by different network operators, as desired. In addition, the two core networks may be operated independently of one another (e.g., if they operate according to different RATs), or may be operated in a somewhat coupled or tightly coupled manner.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more cellular radio access technologies (RATs).

Figure 3:
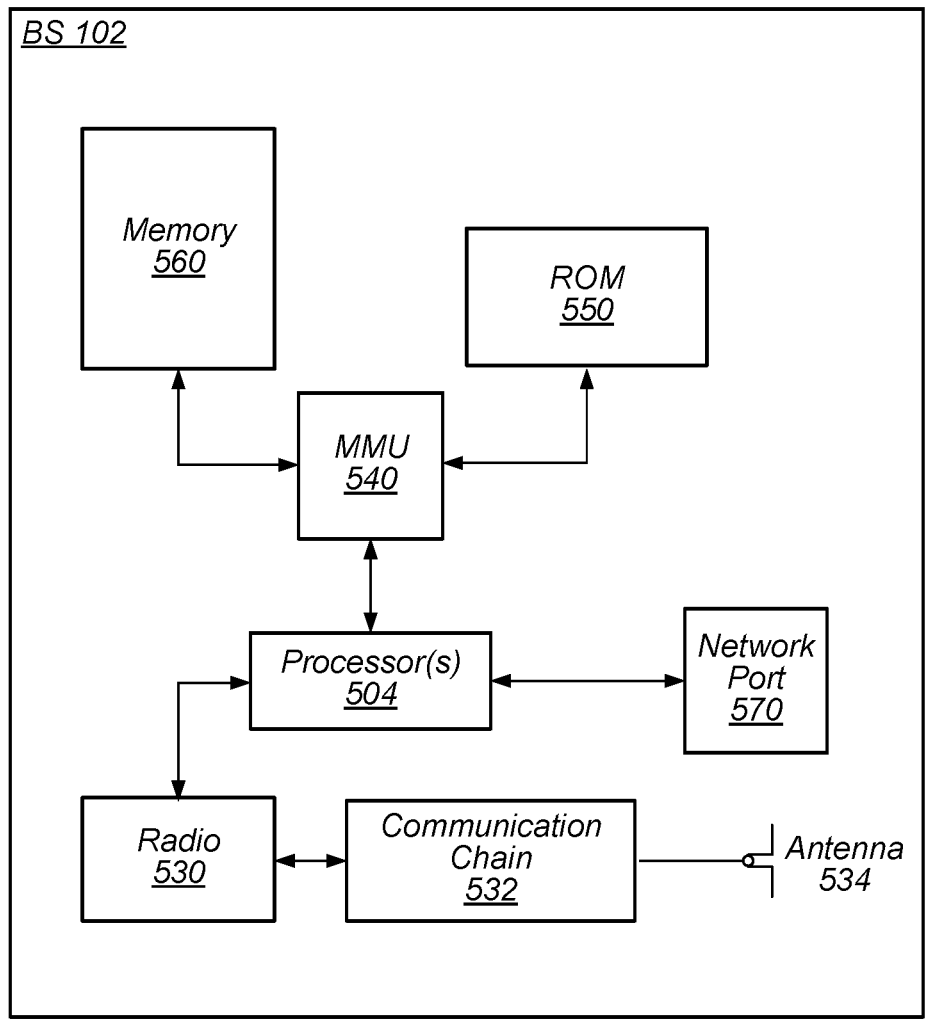
FIG. 3 is an example block diagram of a base station, according to some embodiments.

FIG. 3—Base Station

FIG. 3 illustrates an exemplary block diagram of a base station 102, according to some embodiments. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement various base station functionality, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
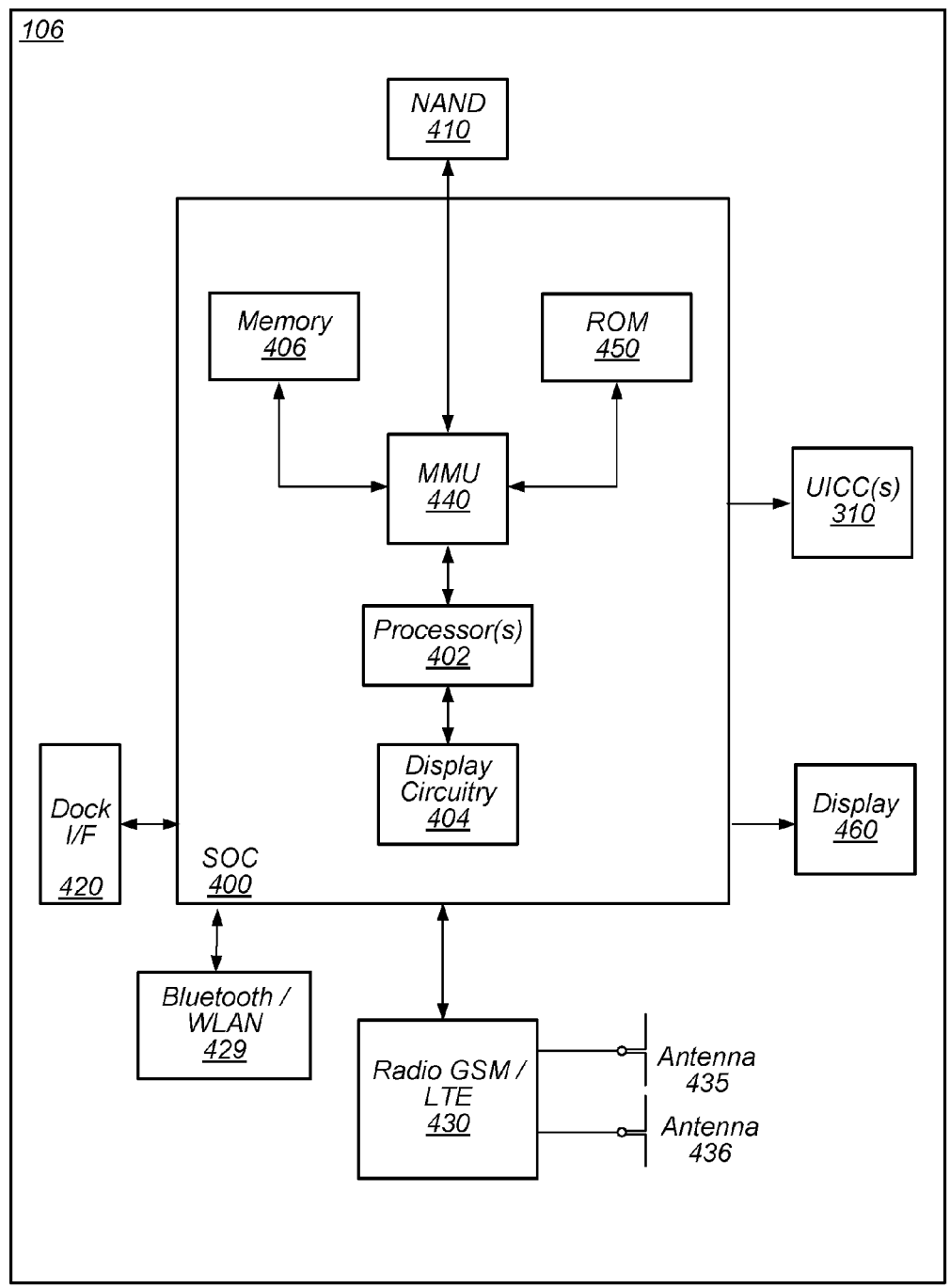
FIG. 4 is an example block diagram of a UE, according to some embodiments.

FIG. 4—User Equipment (UE)

FIG. 4 illustrates an example simplified block diagram of a UE 106, according to some embodiments. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The UE 106 may further comprise two or more smart cards 310 that each comprises SIM (Subscriber Identity Module) functionality, such as two or more UICC(s) (Universal Integrated Circuit Card(s)) 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402, which may execute program instructions for the UE 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the UE 106 comprises at least one subscriber identity module (SIM) 310. The at least one SIM 310 may take the form of an embedded SIM (eSIM) or a removable card, or some combination thereof. As one example, the at least one SIM 310 is a smart card, such as a UICC, which executes one or more Subscriber Identity Module (SIM) applications and/or otherwise implement SIM functionality. The at least one smart card may be only a single smart card, or the UE 106 may comprise two or more SIM smart cards. Each SIM smart card 310 may be implemented as a removable smart card, or may be embedded, e.g., may be soldered onto a circuit board in the UE 106. Thus the SIM(s) 310 may be one or more removable smart cards (such as UICC cards, which are sometimes referred to as "SIM cards"), and/or the SIM(s) 310 may be one or more embedded cards or memories (such as embedded UICCs (eUICCs), which are sometimes referred to as "eSIMs" or "eSIM cards"). In some embodiments (such as when the SIM(s) 310 include an eUICC), one or more of the SIM(s) 310 may implement embedded SIM (eSIM) functionality. In such an embodiment, a single one of the SIM(s) 310 may execute multiple SIM applications. Each of the SIM(s) 310 may include components such as a processor and a memory. Instructions for performing SIM/eSIM functionality may be stored in the memory and executed by the processor. In some embodiments, the UE 106 may comprise a combination of removable SIM cards and fixed/non-removable SIMs (such as one or more eUICC cards that implement eSIM functionality), as desired. For example, the UE 106 may comprise two embedded SIMs 310, two removable SIMs 310, or a combination of one embedded SIM 310 and one removable SIM card 310. Various other SIM configurations are also contemplated.

As noted above, in some embodiments, the UE 106 comprises two or more SIMs 310, each implementing SIM functionality. The inclusion of two or more SIMs 310 in the UE 106 may allow the UE 106 to support two different telephone numbers and may allow the UE 106 to communicate on corresponding two or more respective networks. For example, a first SIM 310 may comprise SIM functionality to support a first telephone number on the UE, and a second SIM 310 may comprise SIM functionality to support a second telephone number on the UE. Where the UE 106 comprises two SIMs 310, the UE 106 may support Dual SIM Dual Standby (DSDS) functionality. The DSDS functionality may allow the UE 106 to be connected to a first network performing a first active call and to receive a second call at the same time. Thus the DSDS functionality may allow either of the two SIMs 310 in the UE 106 to be on standby waiting for a voice call and/or data connection. In DSDS, when a call/data is established on one SIM 310, the other SIM 310 is no longer active. In some embodiments, DSDS functionality may be implemented with a single physical SIM (e.g., a eUICC) that executes multiple SIM applications for the same or different carriers and/or RATs. A single physical SIM executing two SIM applications may be referred to as having two SIMs (two logical SIMs).

As noted above, the UE 106 may be configured to communicate wirelessly using multiple radio access technologies (RATs). As further noted above, in such instances, the cellular communication circuitry (radio(s)) 430 may include radio components which are shared between multiple RATs. In some embodiments, the cellular communication circuitry 430 may comprise two distinct radios, each having a receive chain and a transmit chain. In some embodiments, the two radios may support separate RAT stacks. Additionally, or alternatively, one or more of the RAT stacks may be capable of utilizing either radio.

As described herein, the UE 106 may include hardware and software components for implementing caller ID features on a second call received to the DSDS UE when the UE is already actively engaged in a first call, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
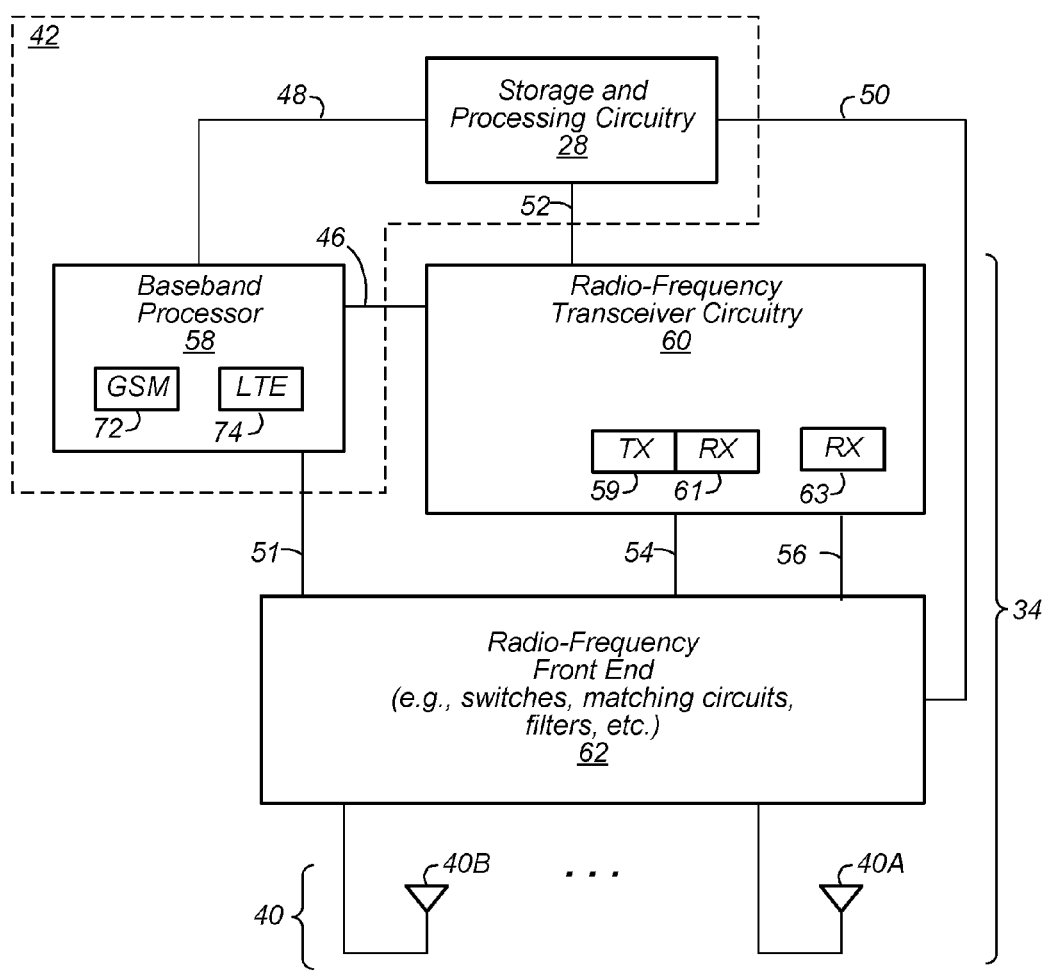
FIG. 5 is an example block diagram of wireless communication circuitry in the UE, according to some embodiments.

FIG. 5—UE Transmit/Receive Logic

FIG. 5 illustrates a portion of UE 106, according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM protocol stack 72, LTE protocol stack 74, and 1× protocol stack 76, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or baseband processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown, radio-frequency transceiver circuitry 60 comprises transceiver (TX) chain 59, receiver (RX) chain 61, and RX chain 63. The embodiment shown may be considered to comprise two radios, which share a single TX chain. Other embodiments are of course contemplated.

Figure 6:
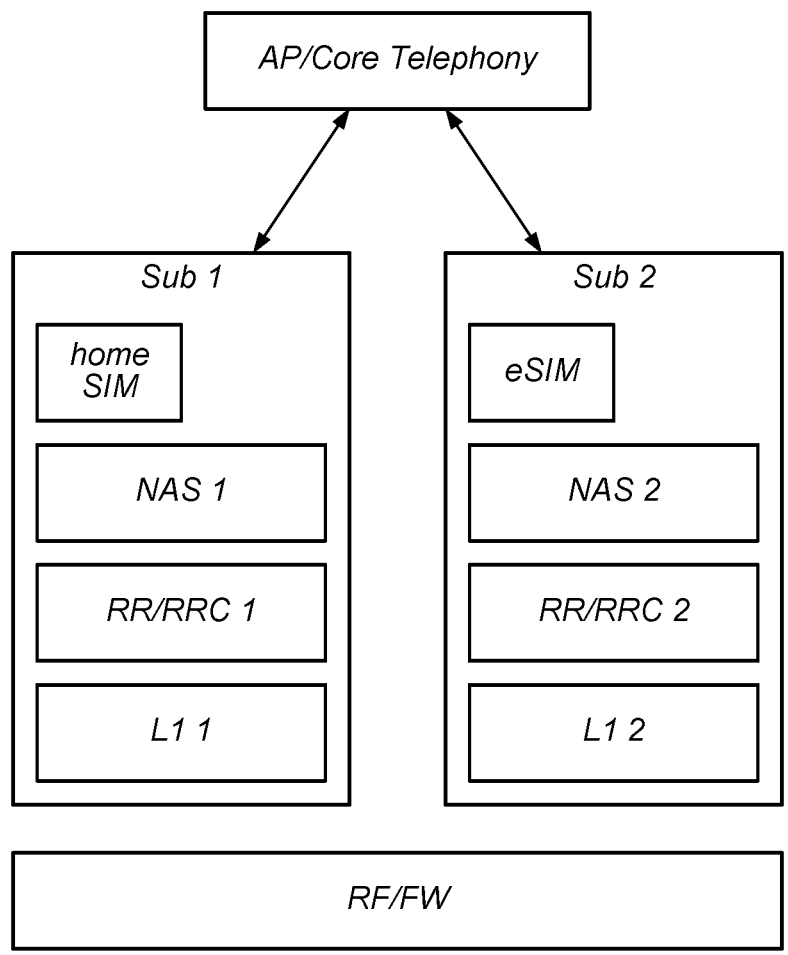
FIG. 6 is an example block diagram of a protocol stack system, according to some embodiments.

FIG. 6—DSDS with Caller ID Related Enhancements

FIG. 6 illustrates a simplified embodiment of a communications protocol stack system on a UE capable of dual SIM dual standby (DSDS) functionality, according to some embodiments. The system involves two protocol stacks associated with two different subscriber profiles, referred to as subscriber 1 (sub 1) and subscriber 2 (sub 2). Sub 1 operates in conjunction with a home subscriber identity module (home SIM), which may be a physical SIM or an embedded subscriber identity module (eSIM), and Sub 2 operates in conjunction with a SIM, which may also be a physical SIM or an eSIM. In some embodiments, Sub 2 may operate in conjunction with an eSIM. Both Sub 1 and Sub 2 may use multiple radio access technologies (RATs), such as LTE, WCDMA, TDS-CDMA, and/or GSM, and may be capable of communicating through both packet-switched (PS) service and circuit-switched (CS) service. The two protocol stacks interact with one shared application layer. The functionality of the application layer may include providing an interface by which programs may obtain information or issue commands concerning cellular communications on the UE. In some implementations, the application layer may comprise AP/Core Telephony technology.

As shown in FIG. 6, each of Sub 1 and Sub 2 may comprise a number of protocols that operate between the SIMs and the hardware layer. However, embodiments of a protocol stack system may comprise various other protocols. NAS 1 and NAS 2 are non-access stratum (NAS) protocols providing high-level functionality, including session management procedures to monitor connectivity between the UE and a network. NAS 1 and NAS 2 may interact with the home SIM and the eSIM, respectively. RR/RRC 1 and RR/RRC 2 refer to radio resource control (RRC) protocols. The functions of the RRC protocol sublayers include security services, the broadcast of system information related to the corresponding NAS layers, and the oversight of an RRC connection. L1 and L2 are file layers within their corresponding stacks. Responsibilities of L1 and L2 include communicating to their corresponding RATs. RF/FW indicates a radio frequency/firmware hardware layer, shared between the two stacks. The hardware layer may comprise physical radio components, e.g., two receivers and one transmitter, and is responsible for conveying communications between stack 1 (Sub 1) and stack 2 (Sub 2) and their corresponding networks.

Figure 7:
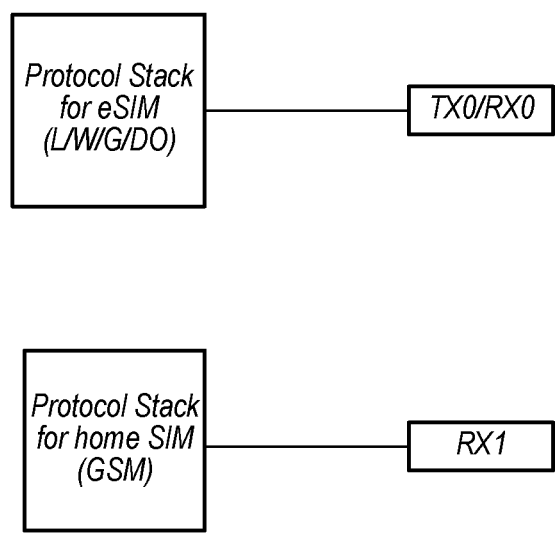
FIG. 7 is an example block diagram of a protocol stack system, according to some embodiments.

FIG. 7—DSDS UE with Enhanced Caller ID Capabilities

FIG. 7 illustrates a simplified embodiment of two protocol stacks operating on a UE capable of dual SIM dual standby (DSDS) functionality, according to some embodiments. One protocol stack (stack 1) operates in conjunction with an eSIM, and supports communications using multiple radio access technologies (RATs), such as LTE, WCDMA, TDS-CDMA, and/or GSM. The second protocol stack (stack 2) operates in conjunction with a home SIM and may support various RATs, such as GSM technology. The embodiment contains two receivers (RX0 and RX1) and one transmitter (TX0).

In the example scenario shown, stack 1 operates a voice call associated with the eSIM using RX0 to receive voice communications and call information from the network and TX0 to transmit voice communications and call information to the network. This first call may use any of multiple RAT technologies, including LTE, WCDMA, TDS-CDMA, and GSM technology, and may use circuit-switched or packet-switched service. In this scenario, stack 2 may operate in a standby mode, using RX1 to monitor CS service for incoming pages for the home SIM.

Figure 8:
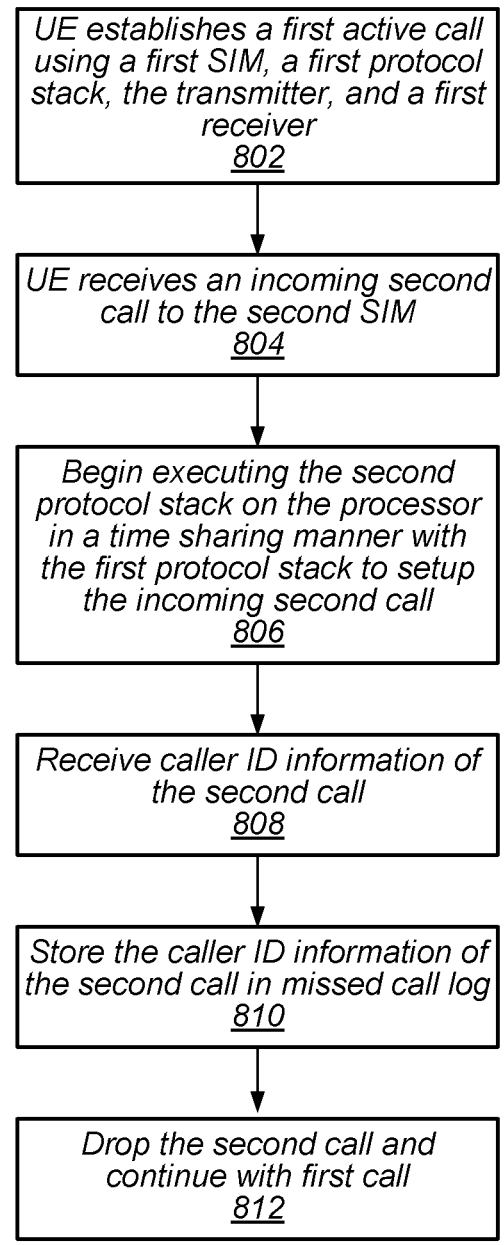
FIG. 8 is an example flowchart diagram illustrating a method by which a DSDS UE device may retrieve caller ID information representing the originator of an incoming second call while engaged in an active first call, according to some embodiments.
Figure 9:
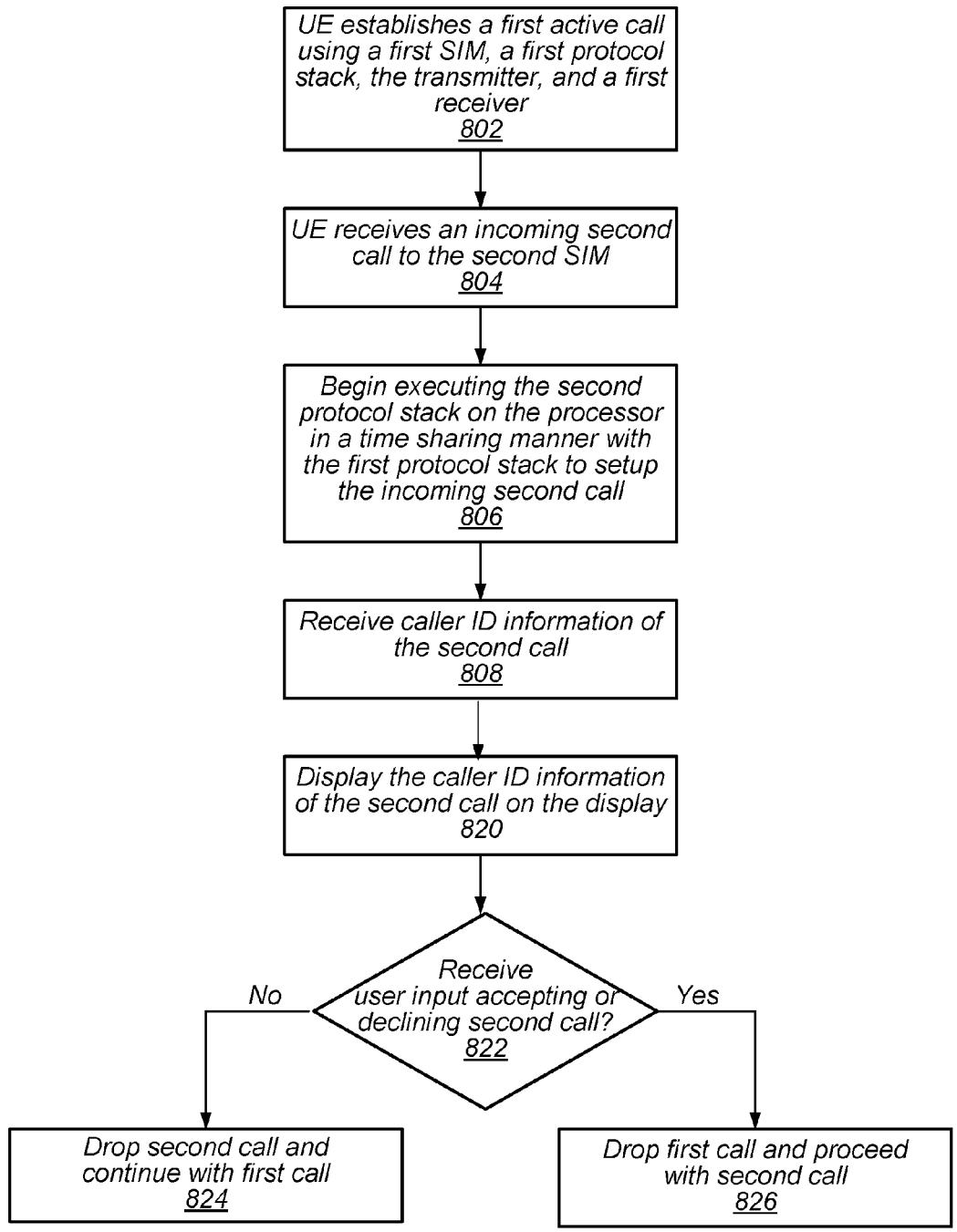
FIG. 9 is an example flowchart diagram illustrating a method by which a DSDS UE device may present a user with the option of accepting or declining an incoming second call while engaged in an active first call, according to some embodiments.

FIGS. 8-9—Managing Second Call During Active First Call on DSDS UE

DSDS (Dual SIM Dual Standby) is a modem system with two SIMs. In a DSDS UE with a single transmitter and a single receiver, when neither SIM is in use in a call, both SIMs are in standby mode and each is able to accept a call. However, once one SIM accepts a call and becomes active, the other SIM becomes inactive. Thus in DSDS, each of the SIMs is capable of operating in standby during idle mode to monitor for received pages. One limitation of DSDS in a single transmitter/single receiver implementation is that whenever a voice call on one SIM is set up either by a Mobile Originated (MO) or Mobile Terminated (MT) call, any page on the other SIM cannot be received. This is due to the transmitter and receiver being occupied by the ongoing voice call on the first SIM.

DSDA (Dual SIM Dual Active) is a modem system with dual SIMs and capable of supporting two simultaneous voice calls. A DSDA UE may comprise two receiver systems and two transmitter systems, where each transmitter/receiver pair corresponds to one SIM. In most common scenarios, DSDA is used as follows:

1) During a voice call on the first SIM, if a second call on the second SIM is received, the caller ID of the second call is presented to the user to identify the calling party of the second call.

2) The user can choose to ignore the incoming call from the second SIM during the voice call on the first SIM, or the user can choose to hold the current call and switch to the incoming call.

In some embodiments, both 1) and 2) may require two transmitters. More specifically, in some embodiments two transmitters may be required to receive caller ID information during a voice call. The voice call may be established on a RRC (Radio Resource Control) connection with dedicated channels with one SIM. In order to receive caller ID information on a second incoming call, the UE may establish another RRC connection with dedicated channels simultaneously on the other SIM. The UE may then transmit and receive NAS Call Control (CC) Messages (e.g., Page Response and CC setup) to receive the caller ID information from the CC setup message from the network. In some embodiments, two transmitters may also be required to be able to hold/switch between voice calls on each SIM. The UE not only may maintain two simultaneous RRC connections with dedicated channels for RRC and NAS signaling messages consistently exchanged with the network during the entire duration of voice call, it also may maintain on-time delivery of consistent voice frames between the 2 calling parties, even though one call is on hold. This is because there are periodic silence voice frames exchanged between the UE and the network to keep the voice call link active.

The first scenario above (receiving caller ID during a voice call) may be more important than the second scenario above (being able to hold/switch between voice calls on each SIM) because the user may be able to drop the ongoing call on one SIM and call the other SIM as long as the user knows the caller ID information of the second incoming call received during the first call.

Thus, existing methods of handling a second incoming call, while engaged in a first call, in order to receive caller ID information or provide the user with the option to accept or decline the second call, may require at least two receivers and two transmitters. It would be desirable for a DSDS UE having at least two receivers and only one transmitter to be able to provide similar functionality in handling a second incoming call. Two example embodiments of a method by which such a UE may share the single transmitter with two protocol stacks, each protocol stack corresponding to a respective SIM, to handle a second incoming call, are described in detail below.

FIG. 8 is a flowchart diagram illustrating a method by which a UE device, which is configured for DSDS and comprises a single transmitter and at least two receivers, may, while engaged in an active first call associated with a first SIM, receive caller ID information representing the originator of a second call targeting the second SIM, according to some embodiments.

At 802, the UE establishes the first active call using the first SIM operating in conjunction with a first protocol stack, the single transmitter, and a first receiver. The single transmitter and the first receiver may be used to actively convey cellular voice communications between the UE and a network. The first SIM associated with this first call may be one of either the home SIM or the eSIM. This first call may use various radio access technologies (RATs), including but not limited to VoLTE, WCDMA, TDS-CDMA, and GSM. During the first call, a second receiver, which is not involved in the first call, may be used to monitor circuit switched (CS) service to detect incoming pages for the second SIM.

At 804, while the first call described at 802 is active, the UE may receive a second incoming call intended for the second SIM. For example, the user of another UE device may have initiated an outgoing call targeting the subscriber profile associated with the second SIM, after which the second receiver, which is monitoring the CS network for incoming pages, may then receive communications from the network representing an incoming page for the second SIM. This second call may use various radio access technologies (RATs), including but not limited to VoLTE, WCDMA, TDS-CDMA, and GSM.

At 806, after receiving a second call during an active first call, the UE may begin executing a second protocol stack associated with the second SIM to set up the incoming second call. During at least a portion of the period of setting up the incoming second call, the UE may operate to share the single transmitter among the first and second protocol stacks. In other words, the first and second protocol stacks may execute in a time multiplexed fashion (time-sharing manner) on the processor.

In order to set up the second call, the second protocol stack may perform the following call setup activities: establishing an RRC connection with the base station; establishing a dedicated channel for RRC signaling messages; establishing a NAS connection with the base station on top of the established RRC connection, which includes NAS authentication; and sending a page response message to the base station.

At 808, the UE may receive communications from the base station, e.g., CC setup communications, which contain the caller ID information of the second call. Because the second protocol stack is able to execute on the processor during at least a portion of the incoming second call, the second protocol stack is able to communicate with the base station sufficiently to receive the caller ID information of the second call. More specifically, the second protocol stack is able to detect the page of the second call and set up the call sufficiently to receive the call control setup message from the base station, wherein the call control setup message contains the caller ID information of the second call. Thus, the UE may be configured to execute the second protocol stack to handle the incoming second call until the NAS (Non-access Stratum) message 'CC setup' is received from the base station.

At 810, the UE may be configured to store the caller ID information associated with the originator (calling party) of the second call as received in 808. In some embodiments, the UE may be configured to save the caller ID information to a data structure or a call log that the UE may later access to provide the user with a representation of the caller ID information. Thus, the user may be informed of information concerning the calling party.

At 812, after receiving and storing caller ID information associated with the originator of the second call, the UE may be configured to drop the second call by discontinuing operation of the second protocol stack on the processor. In other words, the UE may discontinue time-sharing the processor with the second protocol stack and may revert to executing only the first protocol stack on the processor. In this way the first call may be maintained.

Some benefits of dropping the second call as shown at 812 can be summarized as follows:

1. The above-mentioned setup period for the second call typically takes a period of around ten seconds. However, the duration of a voice call (e.g., the first ongoing call) may take a much longer period of time, typically several minutes but possibly hours. For the duration of call setup of the second call, call setup places an added burden on the processor and single transmitter of the UE, which may also be occupied with the first ongoing call. By discontinuing the second call after retrieving the caller ID of the calling party, the existing voice call link of the first call is more likely to be maintained without radio link failure, and also the time period during which handling of the second affects the quality of the first call is reduced, thus minimizing quality degradation of the first call.

2. The above-mentioned call setup procedure for the second call may only involve NAS/RRC signaling messages. Even though these signaling messages are transmitted and received on a dedicated channel, they are carried in acknowledged mode Layer 2 protocol PDUs, which are relatively unlikely to fail due to L2 retransmission.

3. Even though the single transmitter is shared between the two protocol stacks during the call setup period, it is still possible that the transmissions of one SIM experiences an interference issue due to receptions on a different radio frequency for the other SIM. Due to the above-mentioned brevity of call setup and robustness of L2 retransmission, transmission blanking on the transmissions of either SIM or reception blanking on the receptions of either SIM are more likely to avoid disruption of the first call through radio link failure or of the second call through setup failure.

FIG. 9 is a flowchart diagram illustrating an alternative method by which the UE may handle an incoming second call for a second SIM while engaged in a first call associated with a first SIM, according to some embodiments. In the method shown in FIG. 9, steps 802-808 are performed as described above. However, instead of automatically discontinuing the second call after retrieving the caller ID information of the originator of the second call, the UE may instead provide the user with the option to accept or decline the call.

At 820, after receiving caller ID information associated with the originator of the second call as in 808, the UE may be configured to present a form of the caller ID information to an external interface of the UE, e.g. an interface configured to present the caller ID information to the user of the UE. For example, the UE may present information associated with the caller ID information, such as a name or phone number, on the display of the UE. The UE may prompt the user to accept or decline the second call based on this displayed information.

At 822, the UE may receive input from the user indicating a preference to either ignore or proceed with the second call. The UE may wait for user input for a period of time before the second call is automatically discontinued. In other words, if the user does not indicate a preference towards accepting or declining the second call for a period of time, the second call may be dropped. Until the call is dropped, the UE may maintain both protocol stacks and both calls. Not only does the UE convey active communications for the first call, but to maintain the second call link, the UE also exchanges silence voice frames with the network. This scenario may burden the processor and single transmitter with two ongoing calls associated with two protocol stacks.

At 822, the UE may receive input indicating a preference to dropping the second call and continuing with the first call. In this case, at 824 the UE may drop the second call by discontinuing operation of the second protocol stack on the processor. In other words, the UE may discontinue time-sharing the processor with the second protocol stack, and may revert to executing only the first protocol stack on the processor. In this way the first call may be maintained.

At 822, the UE may receive input indicating a preference to accepting the second call. In this case, at 826 the UE may drop the first call by discontinuing operation of the first protocol stack on the processor. In other words, the UE may discontinue time-sharing the processor with the first protocol stack, and may proceed to executing only the second protocol stack on the processor. In this way the user may proceed with the second call.

Various different radio access technologies (RATs) may be used for each of the currently active call and the incoming call, i.e. the first call and the second call. For example, any of Voice over LTE, WCDMA, TDS-CDMA, and GSM may be used for each of the currently active call and/or the incoming call. Other RATs may be used as well, either in combination with the above-described RATs or on their own.

The following are examples or possible use cases of operation of the method described herein.

Note: W=WCDMA; T=TDS-CDMA; G=GSM

VoLTE call and VoLTE call setup—receive an incoming VoLTE caller ID on one SIM while in VoLTE call on the other SIM.

W/T voice call and W/T call setup—receive an incoming W/T caller ID on one SIM while in W/T voice call on the other SIM G voice call and G voice call setup—receiving G calling ID on one SIM while in G voice call on the other SIM VoLTE call and W/T voice call setup—receive W/T calling ID on one SIM while in VoLTE call on the other SIM W/T voice call and VoLTE call setup—receive VoLTE calling ID on one SIM while in W/T voice call on other SIM VoLTE call and G voice call setup—receive G calling ID on one SIM while in VoLTE call on other SIM G voice call and VoLTE call setup—receiving VoLTE calling ID on one SIM while in G voice call on other SIM W/T voice call and G voice call setup—receive G calling ID on one SIM while in W/T voice call on other SIM G voice call and W/T voice call setup—receive W/T calling ID on one SIM while in G voice call on other SIM VoLTE Call and VoLTE Call Setup In one scenario, while a voice over LTE (VoLTE) call is ongoing for a first SIM, the UE may receive an LTE page for the second SIM. In either dual receive full concurrency RF mode or dual receive diversity RF mode, the second receiver may be able to receive the LTE page while the first receiver is occupied with LTE data transfer (e.g., MIMO or single receiver). After the second receiver receives the LTE page, an RRC connection may be established on the second SIM. The UE may use this connection to exchange IMS communications with the network to set up a second call for the second SIM. These communications may comprise: (1) an invite from the network, and (2) the caller ID of the calling party from the network. After receiving the caller ID, the UE may drop the call.

During the second call setup period, a single transmitter may be shared between the two calls according to the following:

(1) In normal radio conditions, VoLTE technology operates on a 40 ms DRX cycle. The relatively low frequency of this cycle provides ample time for the transmitter to handle transmissions for both the active call of the first SIM and the RRC signaling of the second SIM in order to set up the VoLTE call.

(2) In poor cell radio conditions, VoLTE may operate on continuous transmissions using TTI bundling and RLC/

MAC retransmission. The single transmitter may be shared with the second call by forgoing a portion of the transmissions for the first call.

(3) Transmitter blanking and receiver blanking may mitigate the issue of the receivers being desensed by transmissions.

W/T Voice Call and W/T Voice Call Setup

In one scenario, while a voice call on W/T (WCDMA/TDS-CDMA) is ongoing for a first SIM, the UE may receive a W/T page for the second SIM. In either dual receive full concurrency RF mode or dual receive diversity RF mode, the second receiver may be able to receive the W/T page while the first receiver is occupied with the W/T voice call. After the second receiver receives the W/T page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the second call setup period, a single transmitter may be shared between the two calls according to the following:

(1) The first W/T voice call may operate on DPDCH+DPCCH channels with 3 DCH transport channels on DPDCH.

(2) The second W/T call setup may use DPDCH+DPCCH with one DCH transport channel for RRC signaling.

(3) Due to the spread-spectrum nature of W/T technology, the two calls may share the single transmitter on a slot level.

(4) Appropriate increases in transmissions power before a gap in transmissions can increase the success rate of network decoding.

(5) W/T call setup is based on RLC AM mode. Missing packets may be recovered by RLC retransmission.

(6) Transmitter blanking and receiver blanking may mitigate the issue of receivers being desensed by transmissions.

GSM Voice Call and GSM Voice Call Setup

In one scenario, while a voice call on GSM is ongoing for a first SIM, the UE may receive a GSM page for the second SIM. In either dual receive full concurrency RF mode or dual receive diversity RF mode, the second receiver may be able to receive the GSM page while the first receiver is occupied with the first GSM voice call. After the second receiver receives the GSM page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the second call setup period, a single transmitter may be shared between the two calls according to the following:

(1) The first ongoing GSM voice call may use a full rate/half rate TCH channel.

(2) The second GSM call setup may use SDCCH with RR signaling.

(3) Due to the nature of GSM TDMA, the two calls may share the single transmitter on a slot level.

(4) Appropriate increases in transmissions power before a gap in transmissions may increase the success rate of network decoding.

(5) GSM call setup is based on L2 SABM mode. Missing packets can be recovered by L2 retransmission.

(6) Transmitter blanking and receiver blanking may mitigate the issue of receivers being desensed by transmissions.

VoLTE Call and W/T Voice Call Setup

In one scenario, while a voice over VoLTE call is ongoing for a first SIM, the UE may receive a W/T (WCDMA/TDS-CDMA) page for the second SIM. In either dual receive full concurrency RF mode or dual receive diversity RF mode, the second receiver may be able to receive the W/T page while the first receiver is occupied with LTE data transfer (e.g., MIMO or single receiver). After the second receiver receives the page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the W/T call setup period, a single transmitter may be shared between the two calls according to the following:

(1) In normal radio conditions, VoLTE technology operates on a 40 ms DRX cycle. The relatively low frequency of this cycle provides ample time for the transmitter to handle transmissions for both the active VoLTE call of the first SIM and the RRC signaling of the second SIM in order to set up the W/T call.

(2) In poor cell radio conditions, VoLTE may operate on continuous transmissions using TTI bundling and RLC/MAC retransmission. The single transmitter may still be shared with the second (W/T) call by forgoing a portion of the transmissions for the first call.

(3) Transmitter blanking and receiver blanking may mitigate the issue of receivers being desensed by transmissions.

W/T Voice Call and VoLTE Call Setup

In one scenario, while a W/T (WCDMA/TDS-CDMA) call is ongoing for a first SIM, an LTE page may be received for the second SIM. In either dual receive full concurrency RF mode or dual receive diversity RF mode, the second receiver may be able to receive the LTE page while the first receiver is occupied with the W/T voice call. After the second receiver receives the LTE page, an RRC connection may be established on the second SIM. The UE may use this connection to exchange IMS communications with the network to set up a second call for the second SIM. These communications may comprise: (1) an invite from the network, and (2) the caller ID of the calling party from the network. After receiving the caller ID, the UE may drop the call.

During the VoLTE call setup period, a single transmitter may be shared between the two calls according to the following:

(1) The ongoing W/T voice call may operate on DPDCH+DPCCH channels with 3 DCH transport channels on DPDCH.

(2) The VoLTE call setup may use RACH and PDSCH for RRC signaling.

(3) Due to the spread-spectrum nature of W/T technology, the two calls may share the single transmitter on a subframe level.

(4) Appropriate increases in W/T transmissions power before a gap in transmissions can increase the success rate of network decoding.

(5) VoLTE call setup is based on RLC AM mode and HARQ. Missing packets may be recovered by RLC+HARQ retransmission.

(6) Transmitter blanking and receiver blanking may mitigate the issue of receivers being desensed by transmissions.

VoLTE Call and GSM Voice Call Setup

In one scenario, while a voice over LTE (VoLTE) call is ongoing for a first SIM, the UE may receive a GSM page for the second SIM. In either dual receive full concurrency RF mode or dual receive diversity RF mode, the second receiver may be able to receive the GSM page while the first receiver is occupied with LTE data transfer (e.g., MIMO or single receiver). After the second receiver receives the GSM page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the GSM call setup period, a single transmitter may be shared between the two calls according to the following:

(1) In normal radio conditions, VoLTE technology operates on a 40 ms DRX cycle. The relatively low frequency of this cycle provides ample time for the transmitter to handle transmissions for both the active VoLTE call of the first SIM and the RRC signaling of the second SIM in order to set up the GSM call.

(2) In poor cell radio conditions, VoLTE may operate on continuous transmissions using TTI bundling and RLC/MAC retransmission. The single transmitter may still be shared with the GSM call by forgoing a portion of the transmissions for the VoLTE call.

(3) Transmitter blanking and receiver blanking may mitigate the issue of receivers being desensed by transmissions.

GSM Voice Call and VoLTE Call Setup

In one scenario, while a GSM call is ongoing for a first SIM, the UE may receive an LTE page for the second SIM. In either dual receive full concurrency RF mode or dual receive diversity RF mode, the second receiver may be able to receive the LTE page while the first receiver is occupied with the GSM voice call. After the second receiver receives the LTE page, an RRC connection may be established on the second SIM. The UE may use this connection to exchange IMS communications with the network to set up a second call for the second SIM. These communications may comprise: (1) an invite from the network, and (2) the caller ID of the calling party from the network. After receiving the caller ID, the UE may drop the call.

During the VoLTE call setup period, a single transmitter may be shared between the two calls according to the following:

(1) The ongoing GSM voice call may use a full rate/half rate TCH channel.

(2) The VoLTE call setup may use RACH+PDSCH for RRC signaling.

(3) Due to the nature of GSM TDMA, the two calls may share the single transmitter on a slot or subframe level.

(4) Appropriate increases in transmissions power before a gap in transmissions can increase the success rate of network decoding.

(5) VoLTE call setup is based on RLC AM mode and HARQ. Missing packets may be recovered by RLC+HARQ retransmission.

(6) Transmitter blanking and receiver blanking may mitigate the issue of receivers being desensed by transmissions.

W/T Voice Call and GSM Voice Call Setup

In one scenario, while a W/T (WCDMA/TDS-CDMA) voice call is ongoing for a first SIM, the UE may receive a GSM page for the second SIM. In either dual receive full concurrency RF mode or dual receive diversity RF mode, the second receiver may be able to receive the GSM page while the first receiver is occupied with the W/T voice call. After the second receiver receives the GSM page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the GSM call setup period, a single transmitter may be shared between the two calls according to the following:

(1) The ongoing W/T voice call may operate on DPDCH+DPCCH channels with 3 DCH transport channels on DPDCH.

(2) The GSM call setup may use SDCCH with RR signaling.

(3) Due to the spread-spectrum nature of W/T technology, the two calls may share the single transmitter on a slot level.

(4) Appropriate increases in W/T transmissions power before a gap in transmissions may increase the success rate of network decoding.

(5) GSM call setup is based on L2 SABM mode. Missing packets can be recovered by L2 retransmission.

(6) Transmitter blanking and receiver blanking may mitigate the issue of receivers being desensed by transmissions.

GSM Voice Call and W/T Voice Call Setup

In one scenario, while a voice call on GSM is ongoing for a first SIM, the UE may receive a W/T (WCDMA/TDS-CDMA) page for the second SIM. In either dual receive full concurrency RF mode or dual receive diversity RF mode, the second receiver may be able to receive the W/T page while the first receiver is occupied with the GSM voice call. After the second receiver receives the W/T page, an RRC connection may be established on the second SIM. The UE may use this connection to exchange NAS communications with the network to set up a second call for the second SIM. These communications may comprise: (1) a page response from the UE, (2) CC setup communications, and (3) the caller ID of the calling party from the network. After receiving the caller ID, the UE may drop the call.

During the W/T call setup period, a single transmitter may be shared between the two calls according to the following:

(1) The ongoing GSM voice call may use a full rate/half rate TCH channel.

(2) The W/T call setup may use DPDCH+DPCCH with one DCH transport channel for RRC signaling.

(3) Due to the spread-spectrum nature of W/T technology, the two calls may share the single transmitter on a slot level.

(4) Appropriate increases in transmissions power before a gap in transmissions may increase the success rate of network decoding.

(5) W/T call setup is based on RLC AM mode. Missing packets may be recovered by RLC retransmission.

(6) Transmitter blanking and receiver blanking may mitigate the issue of receivers being desensed by transmissions.

Mitigation of Transmission Desensing Receivers

In RF diversity sharing mode, transmissions for one SIM may cause undesirable desense on simultaneous receptions for the other SIM. The following mitigations may be appropriate:

(1) blanking the transmissions of one SIM on the single transmitter when the other SIM receives a page on an associated receiver.

(2) suspending the transmissions of one SIM (optionally, continue receiving on the receiver associated with this SIM)

when the other SIM performs a location update on the single transmitter or associated receiver.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE) configured to perform voice transmission, comprising:
   at least two antennas;
   at least two SIMs;
   a single transmitter;
   at least two receivers; and
   one or more processors coupled to the single transmitter, the at least two receivers, and the at least two SIMs,
   wherein the UE is configured to:
      conduct a first voice call using the single transmitter and a first receiver and using a first protocol stack associated with a first SIM;
      receive a second voice call on the second receiver, wherein the second voice call is received concurrently with the conducting the first voice call, wherein the second voice call utilizes a second protocol stack associated with a second SIM;
      execute the first and second protocol stacks on the one or more processors to utilize the single transmitter in a time-sharing manner for a period of time to set up the second voice call, wherein caller ID information indicating a calling party of the second voice call is received during this period of time; and
      store the caller ID information of the second voice call for presentation to a user of the UE.

2. The UE of claim 1,
   wherein the UE is configured to discontinue execution of the second protocol stack in response to the caller ID information being received.

3. The UE of claim 1, further comprising:
   a display operable to present the caller ID information indicating the calling party of the second voice call after the first voice call completes.

4. The UE of claim 1,
   wherein the UE is further configured to:
      present the caller ID information on an external interface; and
      receive input selecting one of the first voice call or the second voice call based on the caller ID information.

5. The UE of claim 4, further comprising:
   a display operable to present the caller ID information indicating the calling party of the second voice call while the first voice call remains active.

6. The UE of claim 1,
   wherein, in sharing the single transmitter between the first and second protocol stacks, the UE is configured to:
      detect a page received for the second SIM associated with the second voice call;
      establish an RRC connection for RRC signaling messages;
      establish a NAS connection with a base station using the established RRC connection;
      send a page response message to the base station; and
      receive a call control setup message from the base station, wherein the call control setup message contains the caller ID information.

7. The UE of claim 1,
   wherein the UE implements Dual SIM Dual Standby (DSDS).

8. The UE of claim 1,
   wherein, during the period of time, the UE is further configured to:
      detect a page received for the second SIM associated with the second voice call;
      establish an RRC connection which includes Random Access and establish dedicated channel for RRC signaling messages;
      establish a NAS connection with a base station on top of the established RRC connection, which includes NAS authentication;
      send a page response message to the base station; and
      receive a CC setup message from the base station.

9. The UE of claim 1,
   wherein one or more of the at least two SIMs is an embedded SIM.

10. A user equipment device (UE) configured to perform voice transmission, comprising:
   at least two antennas;
   at least two SIMs;
   a single transmitter;
   at least two receivers;
   a display; and
   one or more processors coupled to the single transmitter, the at least two receivers, and the at least two SIMs,
   wherein the UE is configured to:
      establish a first voice call using the single transmitter and a first receiver and using a first protocol stack associated with a first SIM;
      receive a second voice call to a second SIM on the second receiver, wherein the second voice call is received concurrently with conducting the first voice call, wherein the second voice call utilizes a second protocol stack associated with the second SIM;
      in response to the receiving the second voice call, execute the first and second protocol stacks on the one or more processors to utilize the single transmitter in a time-sharing manner for a period of time to set up the second voice call, wherein caller ID information indicating a calling party of the second voice call is received during this period of time; and display on the display the caller ID information indicating the calling party of the second voice call while the first voice call remains active.

11. The UE of claim 10,
wherein the UE is further configured to:
receive input selecting one of the first voice call or the second voice call; and
in response to the input, discontinue execution of the protocol stack associated with the other of the selected one of the first voice call or the second voice call.

12. The UE of claim 11,
wherein the UE is further configured to, in response to the input, execute only the protocol stack associated with the selected one of the first voice call or the second voice call.

13. The UE of claim 10,
wherein the UE is further configured to perform blanking of transmissions of the first SIM on the single transmitter when the second SIM receives a page on the second receiver.

14. The UE of claim 10,
wherein the UE is further configured to suspend transmissions of the first SIM when the second SIM performs a location update on one of the single transmitter or the second receiver.

15. The UE of claim 14,
wherein the UE is further configured to continue receiving on the first receiver.

16. An apparatus configured to perform voice transmission, the apparatus comprising:
a processing element for use in a mobile wireless device, wherein the processing element is configured to:
conduct a first voice call using a single transmitter of the mobile wireless device and a first receiver of the mobile wireless device and using a first protocol stack associated with a first SIM;
receive a second voice call on a second receiver of the mobile wireless device, wherein the second voice call is received concurrently with conducting the first voice call, wherein the second voice call utilizes a second protocol stack associated with a second SIM;
execute the first and second protocol stacks on one or more processors of the mobile wireless device to utilize the single transmitter in a time-sharing manner for a period of time to set up the second call, wherein caller ID information indicating a calling party of the second voice call is received during this period of time; and
store the caller ID information of the second voice call for presentation to a user of the mobile wireless device.

17. The apparatus of claim 16,
wherein the processing element is further configured to discontinue execution of the second protocol stack in response to the caller ID information being received.

18. The apparatus of claim 16,
wherein the processing element is further configured to:
receive input selecting one of the first voice call or the second voice call; and
in response to the input, discontinue execution of the protocol stack associated with the other of the selected one of the first voice call or the second voice call.

19. The apparatus of claim 16,
wherein the first SIM is an eSIM and wherein the second SIM is a home SIM.

20. The apparatus of claim 16,
wherein the processing element is further configured to present the caller ID information of the second voice call after the first voice call completes.

* * * * *